United States Patent [19]

Brie et al.

[11] Patent Number: 4,531,220

[45] Date of Patent: Jul. 23, 1985

[54] RECEIVER FOR A DATA TRANSMISSION MODEM, COMPRISING AN ECHO CANCELLER AND AN EQUALIZER

[75] Inventors: Richard Brie, Paris; Loïc B. Y. Guidoux, Garancieres, both of France

[73] Assignee: Telecommunications Radioelectriques et Telephoniques, Paris, France

[21] Appl. No.: 542,837

[22] Filed: Oct. 17, 1983

[30] Foreign Application Priority Data

Oct. 15, 1982 [FR] France .................. 82 17289

[51] Int. Cl.³ .......................................... H04B 15/02
[52] U.S. Cl. .................... 375/14; 179/170.2; 370/32
[58] Field of Search ............ 375/12, 14, 99, 101; 333/18; 364/724; 370/32; 179/170.2

[56] References Cited

U.S. PATENT DOCUMENTS

| | | | |
|---|---|---|---|
| Re. 31,253 | 5/1983 | Weinstein | 179/170.2 |
| 4,144,417 | 3/1979 | Oshim et al. | 179/170.2 |
| 4,320,517 | 3/1982 | Godard et al. | 375/14 |
| 4,355,406 | 10/1982 | Guidoux | 179/170.2 |
| 4,404,600 | 9/1983 | Murakami | 333/18 |
| 4,422,175 | 12/1983 | Bingham et al. | 375/14 |

Primary Examiner—Robert L. Griffin
Assistant Examiner—Stephen Chin
Attorney, Agent, or Firm—Thomas A. Briody; William J. Streeter

[57] ABSTRACT

A receiver used in a data transmission modem having a receive path containing a baseband signal and clock signal, and a transmit path. An echo canceller is employed having a transversal filter connected to the transmit path for generating a synthetic echo signal. A self-adaptive equalizer includes a transversal filter connected to receive a data signal from the receive path. Subtracting means subtract the signals from the echo canceller and equalizer from the baseband signal in the receive path. The subtracting means output is sampled at a sampling rate which satisfies the Shannon criteria with respect to a transmit signal in the transmit path. The filter coefficients are controlled in response to the sampled signal. The second and third clocking signals for the echo canceller and transversal filter and self-adaptive equalizer transversal filter are derived from recovered clock signals. Circuit means are connected to the sampling circuit output for deriving first and second error signals for controlling the coefficients of the transversal filters of the echo canceller and self-adaptive equalizer.

3 Claims, 2 Drawing Figures

RECEIVER FOR A DATA TRANSMISSION MODEM, COMPRISING AN ECHO CANCELLER AND AN EQUALIZER

The invention relates to a receiver used in a data transmission modem for recovering, from the baseband signal of the receive path, the data signal transmitted by the remote modem. The receiver comprises an echo canceller incorporating an adjustable processing arrangement comprising at least one transversal filter and receiving a signal from the transmit path, and a self-adaptive equalizer. The equalizer comprises a transversal filter receiving the data signal recovered by the decision circuit of the receiver, and a subtracting circuit for subtracting from the baseband signal of the receive path the synthetic echo and synthetic interference signals generated in the echo canceller and the equalizer. The output signal of the subtracting circuit is sampled for application to a circuit forming the error signals used to adjust the filter coefficients of the echo canceller and the equalizer.

Receivers processing baseband signals are directly utilized in the baseband data transmission modems. But it is alternatively possible to use these receivers in data transmission modems employing carrier modulation, by applying to these receivers the baseband signals resulting from the demodulation of the received signal.

In the receiver under consideration, an echo canceller and a self-adaptive equalizer are employed simultaneously for correctly recovering the received data. The function of the echo canceller is to cancel automatically the unwanted echo signal produced in the receive path of a local modem by the transmitted signal of this modem and superposed on the useful signal originating from the remote modem in the case of full duplex transmission. The function of the equalizer is to cancel automatically the unwanted interference signal superposed on each received data present at the input of the receiver and produced by the previously received data.

A receiver employing at the same time an echo canceller and an equalizer is described in an article by K. H. Mueller, entitled: "Combining Echo Cancellation and Decision Feed-back Equalization" and published in THE BELL SYSTEM TECHNICAL JOURNAL, Vol. 58, No. 2, February 1979, pages 491–500. In this receiver, the coefficients of the transversal filters of the echo canceller and of the equalizer are adjusted simultaneously by using the same error signal formed by the difference between the output signal of the subtracting circuit and the data signal recovered by the decision circuit of the receiver. The criterion utilized for this control is the minimization of the mean-square value of the error signal. In this known receiver, sampling the error signal is effected at the baud frequency and the synthetic echo and synthetic interference signals to be subtracted from the received signal are generated with the same sampling frequency, also equal to the baud frequency. However, the above-mentioned article does not deal with the important practical problem of recovering the clock of the received data, this clock supplying the sampling frequency and determining to a large extent the quality of the echo cancellation and the equalization.

U.S. Pat. No. 4,074,086 also discloses a receiver comprising an echo canceller and an equalizer, these two arrangements operating with the same error signal formed in the same manner as in the above-mentioned article by Mueller. However, in that patent, equalization is effected in a different way, that is to say by means of a transversal filter in the received path before the subtracting circuit and thus before echo cancellation is effected. Recovering the clock signal is effected in a circuit connected to the input of the receive path, that is to say starting from the received signal which has not been subjected to any echo cancellation and equalization process. It seems difficult with this structure to obtain a clock which is really in synchronism with the received data and free from noise, and therefore difficult to cancel correctly the unwanted echo and interference signals.

SUMMARY OF THE INVENTION

The present invention has for its object to provide a receiver by means of which it is possible to obtain simultaneously, with an adequate quality, echo cancellation, equalization and clock recovery.

According to the invention, in a receiver comprising an echo canceller and an equalizer generating synthetic echo and synthetic interference signals which are applied to a subtracting circuit to be subtracted from the baseband signal of the receive path. The output signal of the subtracting circuit is further applied to a circuit for recovering the clock of the received data after having been sampled at a sampling frequency derived from this clock recovery circuit and satisfying the Shannon theorem with regard to the signal transmitted by the modem. The synthetic echo signal is generated at said sampling frequency.

With such a receiver it has been found in practice that the convergence of the assembly is obtained rapidly, which results in a stable recovered clock and in the cancellation of the echo and interference signals. This is a rather suprising result, taking into account the close dependence of the operations of the clock recovery circuit, the echo canceller and the equalizer, which are controlled in the receiver starting from the same signal.

An embodiment of the invention can be more fully appreciated from the following description given by way of example with reference to the accompanying drawings.

DESCRIPTION OF THE PREFERRED EMBODIMENT

Figure 1:
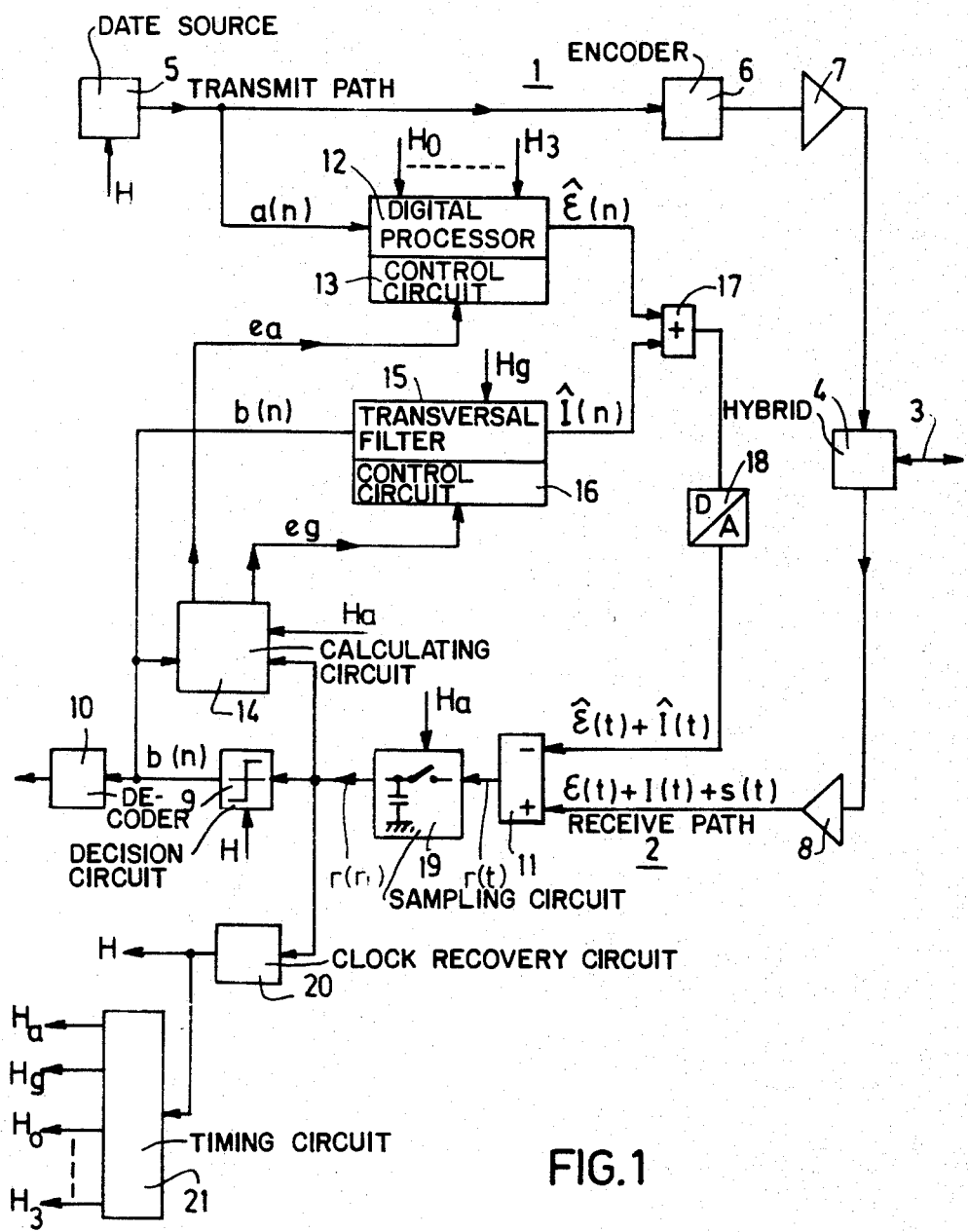
FIG. 1 shows a block diagram of a data transmission modem in which the receiver according to the invention is incorporated.

FIG. 1 shows the structure of a baseband data transmission modem whose receiver includes an echo cancellor and an equalizer. This modem comprises a one-way transmit path 1 and a one-way receive path 2, which are coupled to a two-way transmission line 3 by means of a hybrid coupling circuit 4.

The transmit path 1 is connected to a data source 5 which produces data at a frequency $F=1/T$ determined by the clock signal H. These data may be of the two-level or the multi-level type, that is to say having more than two levels. They are generally applied, as shown in FIG. 1, to an encoder 6 which produces a signal with a spectrum which is better suited to transmission and to recovery of the clock signal in the remote modem than the initial data signal. In the case of two-level data, the encoding operation effected in the encoder 6 may be biphase encoding, according to which the data having the value "1" are represented by the clock signal H having the frequency F and the data having the value "0" are represented by the complement of this clock signal. Such a two-level, biphase encoded signal does not comprise zero frequency components and the major part of its energy is concentrated in the frequency band extending to 2F. The encoding operation effected in the encoder 6 may alternatively be a pseudo-ternary encoding causing a signal having a positive, a negative and a zero level to correspond to a two-level data signal. In the case of a signal encoded in the bipolar code of the order 1, which is a specific case of pseudo-ternary encoding, the major part of the energy is concentrated in the band extending to the frequency F. The signal originating from encoder 6 is amplified in a transmit amplifier 7 before application to the transmit port of coupling circuit 4. The data signal thus processed in transmit path 1 is transmitted to the remote modem, not shown, via transmission line 3.

The data signal transmitted in the same way by the remote modem is received in the local modem shown in the FIG. 1 and is conveyed by coupling circuit 4 to the input of receive path 2 of this modem. In this receive path, the received signal is first amplified in a receive amplifier 8 and thereafter conveyed to a decision circuit 9 of the receiver, which operates at the clock frequency $F = 1/T$ to recover a data signal depending on the data transmitted by the remote modem. Thus, decision circuit 9 can recover a multilevel signal, or a two-level biphase encoded signal if at the transmission the data have been encoded in biphase, or a two-level non-coded signal if at transmission the two-level data have not been encoded or have been encoded pseudo-ternarily. The data signal recovered by decision circuit 9 may optionally be decoded in a decoder 10 before it is used.

Two unwanted signals which may cause an impermissible error rate in the data recovered by decision circuit 9 may be superposed on the useful data signal s(t) originating from the remote modem and appearing at the output of amplifier 8 of the receive path. One of these signals is an echo signal $\epsilon(t)$ which is produced by the signal transmitted by the local modem and is due to unavoidable imperfections of coupling circuit 4 and/or to signal reflections in transmission line 3. The other unwanted signal is a signal known as (intersymbol) interference signal I(t) which is produced by the data symbols originating from the remote modem and transmitted before each data symbol appearing in the receive path, this interference signal being due to amplitude and/or phase distortions by which transmission line 3 may be affected.

In order to eliminate in the receive path these two unwanted signals $\epsilon(t)$ and I(t), an echo canceller and a self-adaptive euqualizer having a common subtracting circuit 11 are used simultaneously, as described in the above-mentioned article by Mueller. The signal supplied by amplifier 8 of the receive path 2 which may be written: $s(t) + \epsilon(t) + I(t)$ is applied to the (+) input of this subtracting circuit 11. Applied to the (−) input of circuit 11 is the signal $\hat{\epsilon}(t) + \hat{I}(t)$, which is the sum of the synthetic echo signal $\hat{\epsilon}(t)$ generated by the echo canceller and the synthetic interference signal $\hat{I}(t)$ generated by the equalizer. When the convergence of the assembly formed by the echo canceller and the equalizer has been achieved, the signals $\hat{\epsilon}(t)$ and $\hat{I}(t)$ are almost equal to the unwanted signals $\epsilon(t)$ and I(t) and the useful data signal s(t) originating from the remote modem and being capable of correct processing by decision circuit 9 for recovering the data is obtained at the output of subtracting circuit 11.

The echo canceller comprises an adjustable digital processor 12 including at least one transversal filter which receives the signal supplied by data source 5 and produces the synthetic echo signal in digital form. Let it be assumed for the present that processor 12 comprises one single digital transversal filter which is operative at the sampling instants nT (or n for the sake of simplicity) having the frequency 1/T of the data produced by source 5. The samples of the data applied at the instants n to the input of the filter constituting processor 12 are designated a(n). This filter is arranged in the usual way so as to store at each instant n, N samples a(n − i) applied to its input (where i is an integer extending from 0 to N − 1) and to calculate the samples of the synthetic echo signal $\hat{\epsilon}(n)$ in accordance with the expression:

$$\hat{\epsilon}(n) = \sum_{i=0}^{N-1} C_i \cdot a(n - i) \tag{1}$$

where $C_i$ represents the coefficients of the filter.

The coefficients $C_i$ are adjustable and are adjusted in a control circuit 13 so as to minimize the mean-square value of an error signal $e_a$ which is elaborated in digital form in a calculating circuit 14. In practice, this can be obtained by iteratively adjusting the coefficients $C_i$ in accordance with the conventional recursion formula:

$$C_i(n+1) = C_i(n) + \alpha \cdot a(n-i) \cdot e_a(n) \tag{2}$$

In the formula, $e_a(n)$ is the error signal at the instant n of an iteration n and $\alpha$ is a fixed coefficient having a small value relative to 1 and determining the magnitude of the modifications to be applied to the coefficients $C_i(n)$ at the iteration n to obtain the coefficients $C_i(n+1)$ at the iteration (n+1).

The self-adaptive equalizer comprises a transversal filter 15 which receives the signal recovered by decision circuit 9 and produces the synthetic interference signal in digital form. Let it be assumed for the present that digital filter 15 is operative at the sampling instants nT having the frequency 1/T of the data recovered by decision circuit 9. The samples of the data applied at the instants n to the input of transversal filter 15 are designated b(n). This filter is arranged so as to store at each instant n, M samples b(n−j) applied to its input (where j is an integer extending from 1 to M) and to calculate the samples of the synthetic interference signals $\hat{I}(n)$ in accordance with the expression:

$$\hat{I}(n) = \sum_{j=1}^{M} G_j \cdot b(n - j) \tag{3}$$

where $G_j$ represents the coefficients of the filter.

The coefficients $G_j$ are adjustable and are iteratively adjusted in a control circuit 16 in accordance with a recursion formula similar to the above formula (2):

$$G_j(n+1) = G_j(n) + \beta \cdot b(n-j) \cdot e_g(n) \tag{4}$$

In this formula, $\beta$ is a fixed coefficient having a small value relative to 1 and $e_g(n)$ is the error signal used to adjust the coefficients of the equalizer and elaborated in calculating circuit 14.

The digital signals (n) and I(n) are added together in an adder circuit 17 and the sum signal obtained is converted into analog form by means of a digital-to-analog converter 18, which produces the correction signal $\hat{\epsilon}(t) + \hat{I}(t)$ applied to the (−) input of subtracting circuit 11.

In the known receiver described in the article by Mueller, the same error signal is always used to control the coefficients of the echo canceller and the equalizer in accordance with the recursion formulae (2) and (4), respectively. In this known receiver, this common error signal is formed at the frequency $F = 1/T$ as the difference between the data b(n) recovered by decision circuit 9 and the samples r(n) formed by sampling at the frequency $1/T$, the signal r(t) produced by subtracting circuit 11. In this known receiver, the digital signals (n) and I(n) are calculated with this sampling frequency $F = 1/T$, which is a frequency insufficient for cancelling, over their complete frequency band, the echo signal and the interference signal which occupy substantially the same frequency band as the transmitted signal. That is to say, as mentioned in the foregoing, the band extending from 0 to 2F in the case of a biphase encoding and the band extending from 0 to F in the case of a bipolar encoding of the order of 1. This results in no information allowing the recovery of the clock of the received data having the frequency $1/T$ being obtained in the signal supplied by subtracting circuit 11. For the rest, in this prior art receiver, there is no circuit for recovering the clock of the received data to have all the elements of the receiver. More specifically the echo canceller and the equalizer, operate and, in the case of a homochronous transmission system, to activate local data source 5.

If one wants to have the clock recovery circuit act on the received signal directly coming from coupling circuit 4, as is described in the above-mentioned U.S. Pat. No. 4,074,086, there is a clock signal beset with the noise produced by the echo signal $\epsilon(t)$ and the interference signal I(t) and consequently having a quality which is inadequate for echo cancellation and equalization.

These drawbacks can be obviated by means of the present invention. According to the invention, the signal r(t) supplied by subtracting circuit 11 is sampled in a sample-and-hold circuit 19 by means of a sampling signal $H_a$ having a frequency $F_a$ which substantially satisfies the Shannon criteria with regard to the signal transmitted by the modem. For example, in the case of a biphase-encoded transmitted signal, the major part of whose energy is located in the band [0–2F], a sampling frequency $F_a$ at least equal to 4F can be chosen. To simplify the description, it is assumed hereinafter that a biphase-encoded transmitted signal is used, with a sampling frequency $F_a$ equal to 4F. The signal thus sampled and supplied by circuit 19 is not only applied to decision circuit 9 and to error calculating circuit 14, but also to a clock recovery circuit 20 which produces the recovered clock signal H having a frequency F. This clock recovery circuit 20 is formed in a way which is known per se by means of, for example, a digital phase lock loop, to synchronize a local clock with the transitions of the signal r(t), sampled in sampling circuit 19. In the case of biphase encoding of the transmitted signal, the signal r(t) has two transitions for each bit period T.

In a timing circuit 21, different control signals and control frequencies for the echo canceller and the equalizer are derived from the recovered clock signal H having the frequency $F = 1/T$ and being supplied by circuit 20. This circuit 21 supplies the signal $H_a$ having the sampling frequency $F_a$ which controls sample-and-hold circuit 19 and which may be equal to 4F in the case of biphase encoding.

In the receiver according to the invention, the synthetic echo signal is generated by digital processor 12 with the sampling frequency $F_a$. When a sampling frequency $F_a = 4F$ is used one knows that it is possible to implement processor 12 by means of four identical transversal filters, not shown, which act on the data signal a(n) produced by source 5, using sampling signals $H_o$ to $H_3$ produced by timing circuit 21. These sampling signals $H_o$ to $H_3$ have the same frequency $1/T$ and are shifted over T/4 relative to each other. The four transversal filters which make up processor 12 form, in accordance with formula (1), the synthetic echo signals $\hat{\epsilon}_0(n)$, $\hat{\epsilon}_1(n)$, $\hat{\epsilon}_2(n)$, $\hat{\epsilon}_3(n)$, respectively which, under the control of the signals $H_o$, $H_1$, $H_2$, $H_3$ are sampled sequentially at instants shifted over T/4 relative to each other. The synthetic echo signals $\hat{\epsilon}_o(n)$ to $\hat{\epsilon}_3(n)$ are multiplexed so as to form at the output of processor 12 the synthetic echo signal $\hat{\epsilon}(n)$ sampled at the frequency $F_a = 4F$. In order to modify the coefficients of the four transversal filters which make up processor 12, the error signal $e_a$ of the echo canceller is calculated in calculating circuit 14 at the sampling frequency $F_a = 4F$. This error signal is applied to control circuit 13 to be distributed in time and to form four error signals $e_{ao}$ to $e_{a3}$, which are each sampled at the frequency $F = 1/T$. The coefficients of the four transversal filters of processor 12 are iteratively adjusted in accordance with the formula (2), by using for these filters the error signals $e_{ao}$ to $e_{a3}$, respectively.

In the case of a synthetic echo signal $\hat{\epsilon}(n)$ formed as described in the foregoing by using a sampling frequency $F_a = 4F$, the echo signal $\epsilon(t)$ can be cancelled in a wide band extending from 0 to 2F, in which the major part of a biphase encoded data signal having the frequency $1/T$ is located. As regards the equalizer, it has been found that it is not absolutely necessary to form the synthetic interference signal $\hat{I}(n)$ with a sampling frequency of the same high value as that used to form the synthetic echo signal. In the example of a biphase encoded signal it is possible to use a sampling frequency $F_g = 2F$ to form the signal $\hat{I}(n)$. In that case, transversal filter 15 of the equalizer receives the signal $H_g$ having the frequency $F_g$ supplied by timing circuit 21 to sample at this frequency the data signal b(n) recovered by decision circuit 9. In filter 15, the samples of the synthetic interference signal $\hat{I}(n)$ are calculated at this frequency $F_g = 2F$, in accordance with a formula which is similar to the formula (3). To modify the coefficients of filter 15, the error signal $e_g$ of the equalizer is calculated in calculating circuit 14 at the sampling frequency $F_g = 2F$. This error signal $e_g$ is applied to control circuit 16, in which the coefficients of filter 15 are iteratively adjusted in accordance with the recursion formula (4).

With a receiver of this construction, in which the signal produced by subtracting circuit 11 is sampled at the Shannon frequency before being applied simultaneously to clock recovery circuit 20 and to circuit 14 forming the error signal for the echo canceller and the equalizer, and in which at least the echo canceller operates at this Shannon sampling frequency, the rather surprising result in practice is that the convergence of the assembly is obtained rapidly, which finds expression in a stable recovered clock and the cancellation of the unwanted echo and interference signals.

A particularly satisfactory operation is obtained when, to adjust the coefficients of the transversal filters of the echo canceller and the equalizer, error signals are used which are formed in the manner described in the non-published French patent application No. 8216998 relating to an echo canceller (PHF 82-582) and in the non-published French patent application No. 8216997 relating to an equalizer (PHF 82-581). According to these Patent Applications filed by Applicants, the filter coefficients of an echo canceller or an equalizer are modified with the aid of an error signal determined at an actual sampling instant by forming the difference between the value of the corrected received signal the echo signal or the interference signal at that sampling instant and the value of this corrected signal at a previous sampling instant, this last-mentioned value of the corrected signal having been multiplied previously by the ratio between the value of the recovered data signal at the actual sampling instant and the value of the recovered data signal at the previous sampling instant. Modifying the coefficients is effected or not effected depending on whether the two values of the recovered data signal differ from zero or whether at least one of these values is equal to zero. If the actual sampling instant and the previous sampling instant, which is used to calculate the error signal and which is not of necessity the immediately preceding instant, are separated by the period T of the data, the error signal e(n) at the actual sampling instant nT (or n to simplify the description) may be written:

$$e(n) = r(n) - r(n-1) \cdot \frac{b(n)}{b(n-1)} \quad (5)$$

r(n) and r(n−1) being the values of the corrected received signal at the sampling instants n and (n−1), b(n) and b(n−1) being the values of the data signal recovered at the sampling instants n and (n−1).

In the case in which the data signal transmitted by the remote modem is a two-level signal or results from a pseudo-ternary encoding of two-level data, the data signal recovered by the decision circuit has a positive and a negative level, characterized by the sign of the corrected signal. So in that case b(n)=Sgn[r(n)] and b(n−1)=Sgn[r(n−1)], where Sgn[ ] means "sign of [ ]". In that case the above formula (5) may be written:

$$e(n)=r(n)-r(n-1)\cdot\text{Sgn}[r(n)]\cdot\text{Sgn}[r(n-1)] \quad (6)$$

Figure 2:
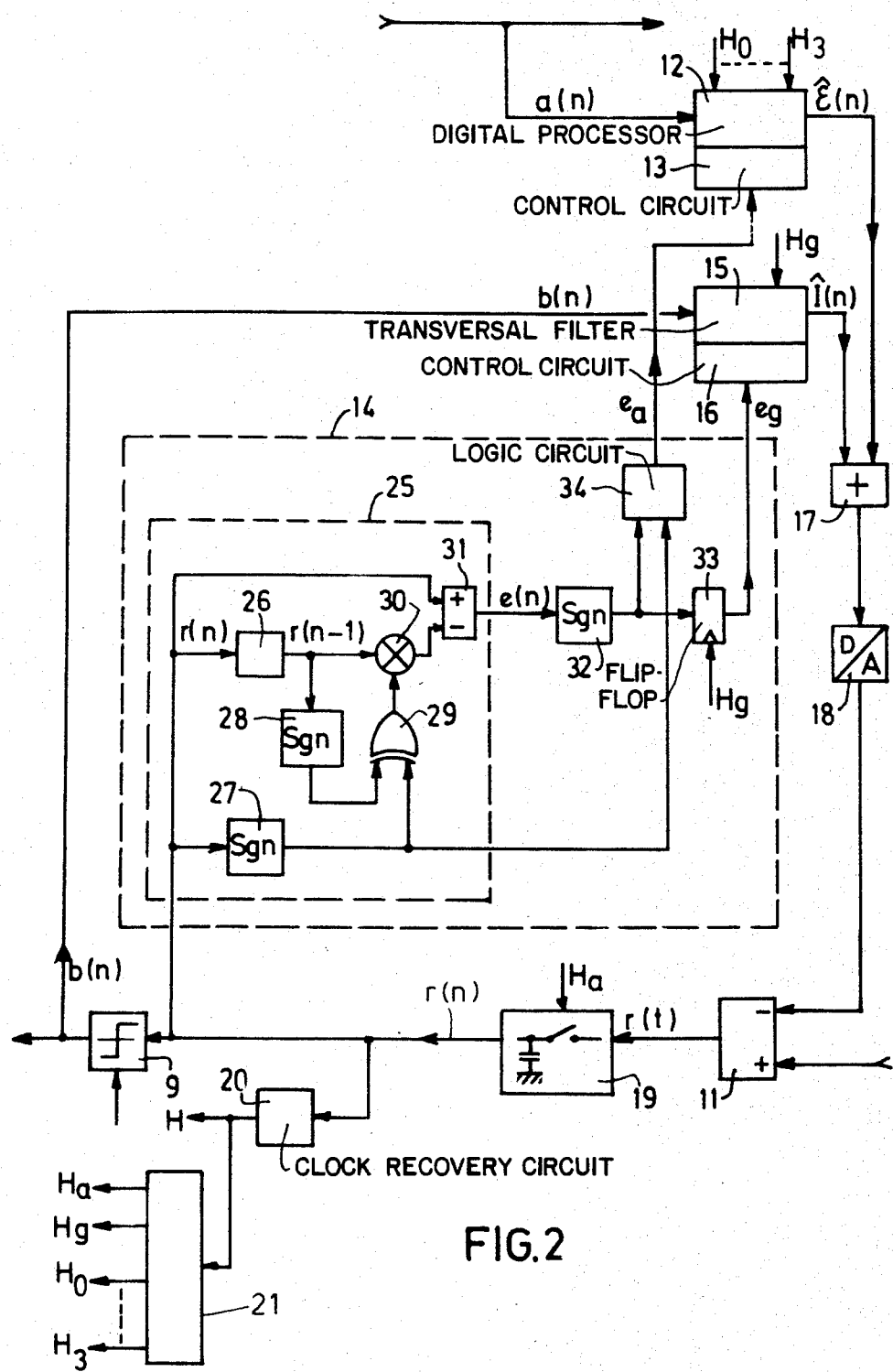
FIG. 2 shows a block diagram of an embodiment of the receiver according to the invention.

FIG. 2 shows an embodiment of a receiver according to the invention which, to adjust the coefficients of the filter of the echo canceller and the equalizer, utilizes an error signal formed in accordance with the procedure described in the two above-mentioned Patent Applications. By way of example, FIG. 2 illustrates the case in which the recovered data signal has a positive level and a negative level, so that the formula (6) is valid and the modifications of the coefficients are always effected, as the recovered data signal never has the zero level. In FIG. 2, elements having the same function as those in FIG. 1 are given the same reference signs.

Let it be assumed for the example illustrated by FIG. 2 that in sampling circuit 19 the received corrected signal r(t) is sampled at a frequency $F_a$ which is equal to 4 times the frequency 1/T of the data, so that the sampling instants $t_a$ may be written: $t_a = n(1+q/4)T$, n being an integer extending from $-\infty$ to $+\infty$ and q assuming the values 0, 1, 2, 3. In decision circuit 9, the data b(n) are recovered at the frequency 1/T at the instant nT, in the form of the quantities Sgn[r(n)]. The error signal e(n) must be calculated at the frequency $F_a$ at all sampling instants $t_a$.

Circuit 14 comprises a portion 25 which calculates this error signal e(n). This circuit portion 25 comprises a delay circuit 26 producing a delay T and being connected to the output of sampling circuit 19, so that at an instant characterized by n the values r(n) and r(n−1) of the signal r(t) are obtained at the two terminals of delay circuit 26. The circuits 27 and 28 are connected to the input and to the output of delay circuit 26, respectively and are formed just like decision circuit 9 with the aid, for example, of a comparator circuit whose inverting input terminal is at the zero potential, so that they produce the quantities Sgn[r(n)] and Sgn[r(n−1)], respectively. An Exclusive OR-circuit 29 forms the product Sgn[r(n)]·Sgn[r(n−1)]. A multiplying circuit 30 forms the product r(n−1)·Sgn[r(n)]·Sgn[r(n−1)] and a subtracting circuit 31, whose (+) input is connected to the input of delay circuit 26 and whose (−) input is connected to the output of multiplying circuit 30, produces the error signal e(n) in accordance with the formula (6).

In the embodiment of the receiver shown in FIG. 2, the error signal e(n) thus formed is not directly used for the adjustment of the filter coefficients of the echo canceller and the equalizer. First, in accordance with a known method by means of which it is possible to simplify the calculation of the coefficients only the sign of the error signal is used, that is to say the quantity Sgn[e(n)] which is formed in a circuit 32.

As regards the equalizer, to adjust the coefficients of filter 15, use is made of a signal $e_g$ formed by only retaining every other of the quantities Sgn[e(n)] formed at the sampling frequency $F_a$, this operation being effected by means of a flip-flop 33, which is connected to the output of circuit 32 and whose clock input receives the signal $H_g$ which has the frequency $F_g = F_a/2$. Thus the signal $e_g$ used to adjust the coefficients of transversal filter 15 in accordance with the formula (4) is generated with the same frequency $F_g$ as that of the synthetic interference signal $\hat{I}(n)$.

For the echo canceller in which the synthetic echo signal $\hat{\epsilon}(n)$ is generated at the frequency $F_a$ by means of the four transversal filters forming digital processor 12 as described in the foregoing, the signal Sgn[e(n)] formed with the sampling frequency $F_a$ could be used directly to adjust the coefficients of these filters but, in accordance with an embodiment of the echo canceller described in above-mentioned French patent application No. 8216998 (PHF 82-582) a signal $e_a$ formed in the following way in a logic circuit 34 is used to adjust these coefficients in accordance with the formula (2). This logic circuit 34 receives at one input the signal Sgn[e(n)] supplied by circuit 32 and at another input the signal Sgn[r(n)] supplied by circuit 27. Logic circuit 34 is arranged to provide a two-bit signal $e_a$, represented by these two bits being equal to zero when the quantities Sgn[e(n)] and Sgn[r(n)] have different values and being equal to +1 or −1 when the quantities Sgn[e(n)] and Sgn[r(n)] have the same values +1 or −1. As demonstrated in said French patent application No. 8216998, the action of the signal Sgn[r(n)] for reducing the residual echo signal is dominant when the echo signal $\epsilon(t)$ has a higher level than the received useful signal s(t), that is to say in practice at the beginning of the convergence of the echo canceller. The action of the signal Sgn[e(n)] is dominant when the echo signal $\epsilon(t)$ has a lower level than the received useful signal s(t) and results in practice in the residual echo signal being fully cancelled.

What is claimed is:

1. A receiver used in a data transmission modem having a receive path containing a baseband signal and clock signal, and a transmit path, comprising:

an echo canceller incorporating an adjustable processor, said processor including a transversal filter connected to said transmit path for generating a synthetic echo signal;

a decision circuit connected to remove a data signal from said receive path;

a self-adaptive equalizer for receiving the data signal recovered by the decision circuit, said equalizer including a transversal filter;

a subtracting means for subtracting signals generated by the canceller and equalizer from said baseband signal in said receive path;

means for sampling a signal produced by said subtracting means at a sampling rate which satisfies the Shannon criteria with respect to a transmit signal in said transmit path;

means for recovering the clock signal in said baseband signal from said subtracting means output signal;

means for generating second and third clocking signals for said echo canceller transversal filter and said self-adaptive equalizer transversal filter from said recovered clock signal, and a control signal for said means for sampling; and circuit means connected to receive a signal from said means for sampling for deriving first and second error signals for controlling the coefficients of the transversal filters of said echo canceller and self-adaptive equalizer, whereby a synthetic echo signal is generated from said echo canceller at said sampling frequency, and a synthetic interference signal is generated by said equalizer.

2. A receiver as claimed in claim 1, wherein the synthetic interference signal is generated at a sampling frequency which is at least equal to half the sampling frequency at which the synthetic echo signal is generated.

3. A receiver according to claim 1 wherein said circuit means comprises:

a difference circuit having a first and second input, said first input connected to said subtracting means output;

a delay circuit connected to said subtracting means for generating a signal delayed one sampling period;

an exclusive OR circuit connected to said subtracting means output and said delay circuit output;

a multiplying circuit for multiplying the output signal of said exclusive OR circuit and a signal from said delay circuit, and supplying said multiplied signal to said second input; and means for inhibiting the modification of said echo canceller transversal filter coefficients, said means responsive to the condition when said signal from said subtracting means and said delay circuit differ from zero or when at least one of said signals is equal to zero.

* * * * *